(12) United States Patent
Gunning et al.

(10) Patent No.: US 7,319,560 B2
(45) Date of Patent: Jan. 15, 2008

(54) PARTITIONED-CAVITY TUNABLE FABRY-PEROT FILTER

(75) Inventors: William J. Gunning, Newbury Park, CA (US); William H. Southwell, Thousand Oaks, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 293 days.

(21) Appl. No.: 10/673,951

(22) Filed: Sep. 29, 2003

(65) Prior Publication Data

US 2005/0068541 A1    Mar. 31, 2005

(51) Int. Cl.
*G02B 27/00* (2006.01)
*G01B 9/02* (2006.01)

(52) U.S. Cl. .................. 359/578; 359/579; 356/519
(58) Field of Classification Search ........... 359/578, 359/579, 357, 359, 360, 585, 519
See application file for complete search history.

(56) References Cited

U.S. PATENT DOCUMENTS

| 4,756,602 A | 7/1988 | Southwell et al. |
| 6,958,818 B1 * | 10/2005 | Payne ........................ 356/519 |

FOREIGN PATENT DOCUMENTS

| CH | 000680534 A5 * | 9/1992 |
| EP | 0571022 A1 | 11/1993 |
| EP | 0571022 A1 | 11/1993 |

OTHER PUBLICATIONS

Southwell, WH, Gunning, WJ, and Hall, RL. "Narrow-bandpass Filter Using Partitioned Cavities," SPIE, vol. 678, Optical Thin Films II, New Developments, 1986, pp. 177-184.
Bass, Michael: Handbook of Optics, vol. 1:1995: pp. 42.73-42.87.
Hemingway, D. J. et al.: "Effective Refractive Indices of Metal-Dielectric Interference Filters": Applied Optics: vol. 6: No. 3: Mar. 1967: pp. 471-476.

* cited by examiner

*Primary Examiner*—Audrey Chang
(74) *Attorney, Agent, or Firm*—Koppel, Patrick, Heybl & Dawson (57) ABSTRACT

A tunable Fabry-Perot filter that is less sensitive to angle of incidence is formed by replacing the cavity (air gap) with a partitioned cavity that has an effective refractive index greater than one. The partitioned cavity includes a pair of partitioned cavity dielectric layers formed on the reflectors on either side of the variable air gap. Each of the dielectric layers has an optical thickness that is less than one fourth the shortest wavelength in the tuning range of the filter. The resulting three-layer partitioned cavity has an effective optical thickness substantially equal to an integral multiple (m) of one half the transmitted wavelength within the tuning range of the filter.

15 Claims, 9 Drawing Sheets

PARTITIONED-CAVITY TUNABLE FABRY-PEROT FILTER

BACKGROUND OF THE INVENTION

1. Field of the Invention

This invention relates to tunable Fabry-Perot filters and more specifically to partitioned-cavity tunable Fabry-Perot filter having a reduced sensitivity to the angle of incidence.

2. Description of the Related Art

Tunable Fabry-Perot filters are narrowband optical filters that are used to transmit light within a narrow band of wavelengths. Such filters can be used to tune or calibrate lasers or to add/drop channels in an optical network. In these systems the light is typically controlled to enter the filter as a parallel collimated beam where all optical rays are parallel to each other. In other applications the Fabry-Perot filter is part of an imaging system and can be used to detect objects by tuning to specific signature wavelengths, in particular astronomical systems. In many imaging systems, a low system f-number is desirable to maximize the light gathering capability of the system and to minimize the blur circle. The gathered light is focused to a point in the system such that the filter is illuminated with a cone of light distributed from normal incidence to a maximum angle determined by the f-number.

A Fabry-Perot filter is a special case of an interference filter. A standard interference filter includes a pair of planar, parallel reflectors, typically multilayer dielectric films, surrounding a solid cavity layer. The structure behaves as an optical resonator; wavelengths for which the cavity optical thickness is equal to an integer number of half wavelengths are resonant in the cavity and transmitted. Other wavelengths within the reflective band of the reflectors are reflected. The condition for a transmission band center wavelength is given by $$m\lambda = 2nd \cos \Theta_c \quad (1)$$

where $m$ = an integar $n$ = cavity layer refractive index $d$ = cavity layer thickness $\Theta_c$ = angle of the light within the cavity layer = arcsin $[(\sin\Theta)/n]$ where $\Theta$ is the angle of incidence in air $\lambda$ = transmitted wavelength As light impinges on the filter at angles greater than 0° (normal incidence), the passband wavelength shifts to shorter wavelength. Since $\Theta_c$ will be smaller for cavities having a higher refractive index, this angle shift is reduced when higher refractive index materials are used for the cavity layer. This is common in fixed Fabry-Perot filters.

A tunable Fabry-Perot filter is a special case of an interference filter in which the solid cavity layer is replaced with a variable air gap. By adjusting the air gap spacing the resonant wavelength condition is varied, resulting in a tunable passband. The tunable Fabry-Perot filter has a significant dependence of passband on the angle of incidence of light. The refractive index of the airgap cavity is equal to 1.0, resulting in the largest possible value for $\Theta_c$ and consequently the largest wavelength shift as a function of angle of incidence.

Figure 1A:
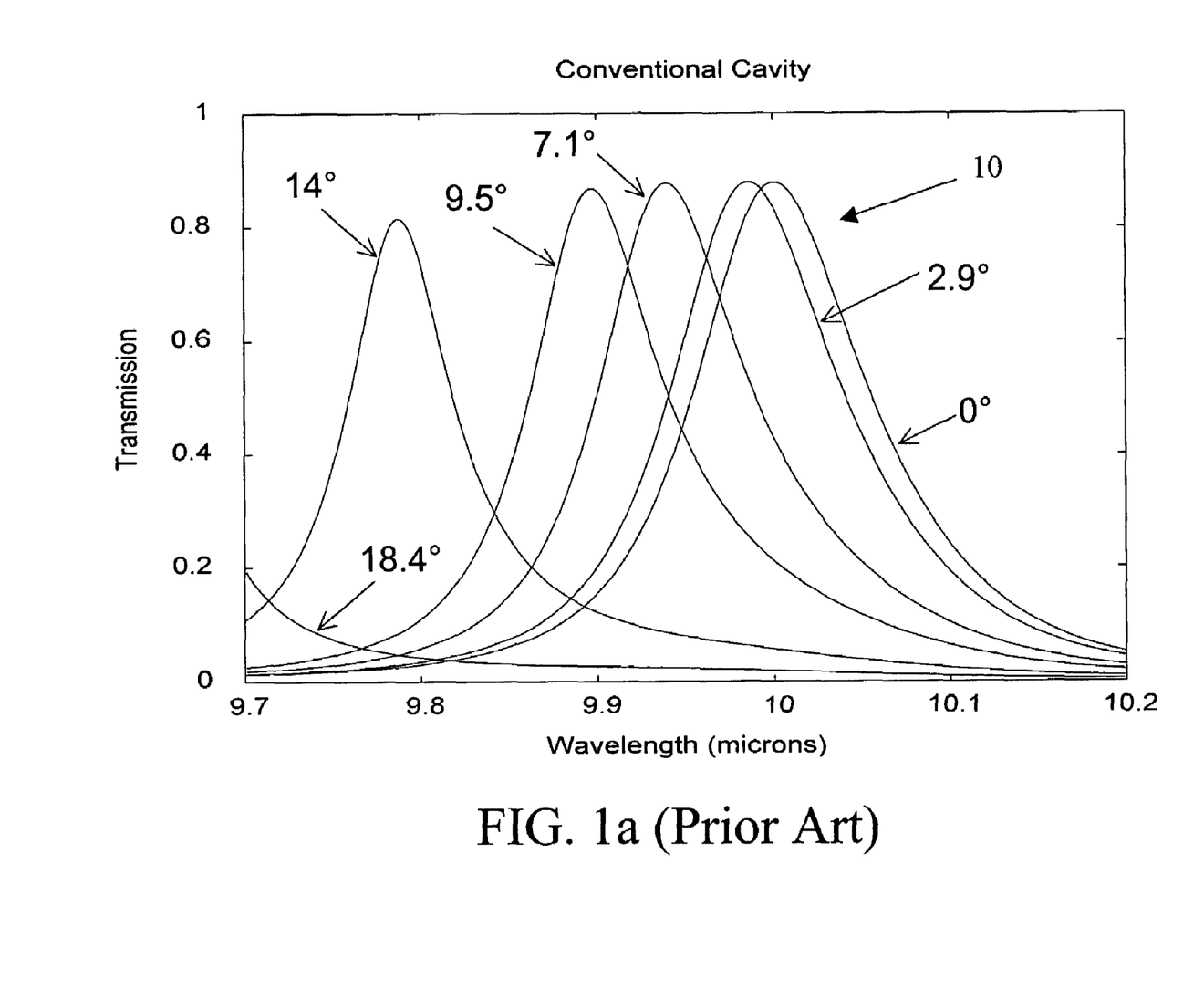
FIGS. 1a and 1b, as described above, are plots of the transmission spectrum versus λ for different angles of incidence (Θ) and f-numbers
Figure 1B:
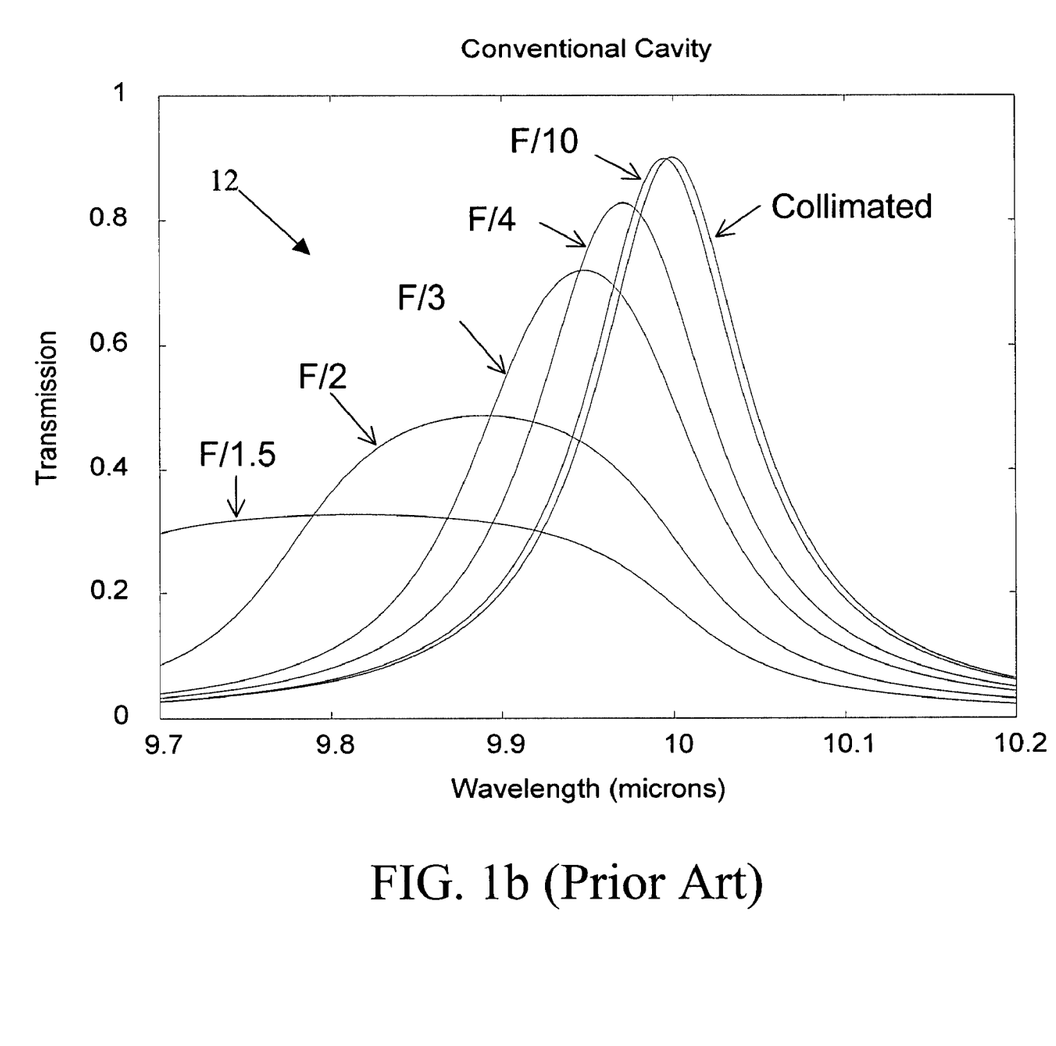

As shown in FIG. 1a, the transmission spectrum 10 of a tunable Fabry-Perot filter shifts to shorter wavelengths as the angle of incidence increases from normal incidence ($\Theta=0°$). FIG. 1b shows a transmission spectrum 12 as a function of f-number where the spectral characteristics are calculated by integrating over all rays within the focused cone of light. The f-number is defined as the focal length of the focusing lens divided by the beam diameter at the lens. The lower the f-number the larger the angle of incidence within the cone, hence the larger the wavelength shift and spectral broadening. In this case the filter spectrum shifts to shorter wavelength and broadens, and peak transmission is reduced, the effect increasing with lower f-numbers.

The transmission spectrum shown in FIG. 1b assumes that the incident cone of light is oriented such that the central ray is normal to the filter surface. In actual fact, within an optical system, each point on the image in the focal plane is illuminated by an incident cone of light, each having its central ray at some angle with respect to the normal. Only the central point in the image is illuminated by a normally incident cone of light. Consequently the angle distribution of the light at the optical system focal plane is actually significantly greater than that simply implied by the system f-number due to this "tilt effect".

One technique for reducing the effect of the angle dependence of a Fabry-Perot filter in an imaging system is to place the filter in front of the focusing lens. In so doing, the filter is illuminated with a parallel collimated beam originating from each point in the object plane (corresponding to a unique point in the image plane). The wavelength shift is still observed because each point in the image is the result of rays entering the system (and hence the filter) at a different angle of incidence. However, the additional spectral broadening that originates from the focusing lens is avoided. In this optical architecture the filter aperture must be as large as that of the optical system, which increases the size, weight and cost of the system. Furthermore, it is not possible to employ a segmented filter array that can wavelength tune each portion of the image independently.

When a Fabry-Perot filter is employed within an optical system, the system is typically designed to have a large f-number to minimize the range of angles employed at the expense light gathering power and blur circle. The "tilt effect" can be significantly reduced by employing a field lens at the original focal plane, creating a telecentric system. Each point in the image is converted to a cone of light with its central ray parallel to the optical system axis. This has the effect of reducing the angle effects of the filter, but the distribution of incident rays is still dictated by the system f-number.

Both techniques to reduce the effect of the angle sensitivity of the tunable Fabry-Perot filters compromise the quality of the imaging system. Neither approach suggests a technique for reducing the angle sensitivity of the tunable Fabry-Perot filter itself while preserving the tunability of the filter.

SUMMARY OF THE INVENTION

The present invention provides a tunable Fabry-Perot filter that is less sensitive to angle of incidence and thus suitable for use in optical imaging systems having lower f-number and hence greater light gathering power. Further, an array of the filters can be positioned near the focal plane of an imaging system allowing spatially selective wavelength tuning of the image.

This is accomplished by replacing the cavity (air gap) with a partitioned cavity that has an effective refractive index greater than one ($n_{eff}>1.0$). The partitioned cavity includes a pair of partitioned cavity dielectric layers formed on the reflectors on either side of a variable air gap. The resulting three-layer partitioned cavity has an effective optical thickness substantially equal to an integral multiple (m) of one half the transmitted wavelength within the tuning range of the filter. The reflectors may be multilayer thin film interference mirrors, graded index films or thin metallic films. Each of the partitioned cavity dielectric layers has an optical thickness that is less than one fourth the shortest wavelength in the tuning range of the filter. The partitioned cavity dielectric layers may be either a uniform composition thin film layer or a graded index layer.

In one embodiment, the reflectors are multilayer thin film interference mirrors (quarterwave stacks) and the partitioned cavity dielectric layers are a uniform composition thin film layer. The tuning range of the filter is limited to the reflective bandwidth of the multilayer reflectors.

In another embodiment, the reflectors are graded index films, commonly referred to as rugate reflectors, and the partitioned cavity dielectric layers are a uniform composition thin film layer. Although more complex than a quarterwave stack, rugate reflectors eliminate higher order harmonics that may affect out of band optical properties.

In another embodiment, the reflectors are thin metallic films and partitioned cavity dielectric layers are a uniform composition thin film layer. The thin metallic films provide high reflectivity over a broad range of wavelengths and less stress on the substrate. However, the absorption in the metallic films reduces the peak transmission of the filter.

In yet another embodiment, a graded index layer is formed on either multilayer thin film or graded index film reflectors. This serves to minimize the residual reflectivity of the mirrors outside of their primary reflection band. As a result, the filter may be designed to have both a narrow bandpass response that is tunable over the first wavelength range and a broader bandpass response over a second wavelength range (where mirror reflectivity is minimized) that exhibits little change as the filter is tuned within the first wavelength range.

Although the partitioned cavity reduces angle sensitivity for filters having m>1, the design is most effective for m=1, the "lowest order" tunable Fabry-Perot filter. When m=1, the relative volume fraction of the two partitioned cavity dielectric layers (n>1.0) within the partitioned cavity versus the air gap (n=1), is the greatest, resulting in the highest effective refractive index for the partitioned cavity. These filters may be single aperture components, with optical dimensions of several mm to several cm, or they may be MEMS structures that are either very small individual filter elements or arrays of independently addressed filters elements.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a tunable Fabry-Perot filter that is less sensitive to angle of incidence and thus suitable for use in optical imaging systems having lower f-number and hence greater light gathering power and smaller blur circle.

Figure 2:
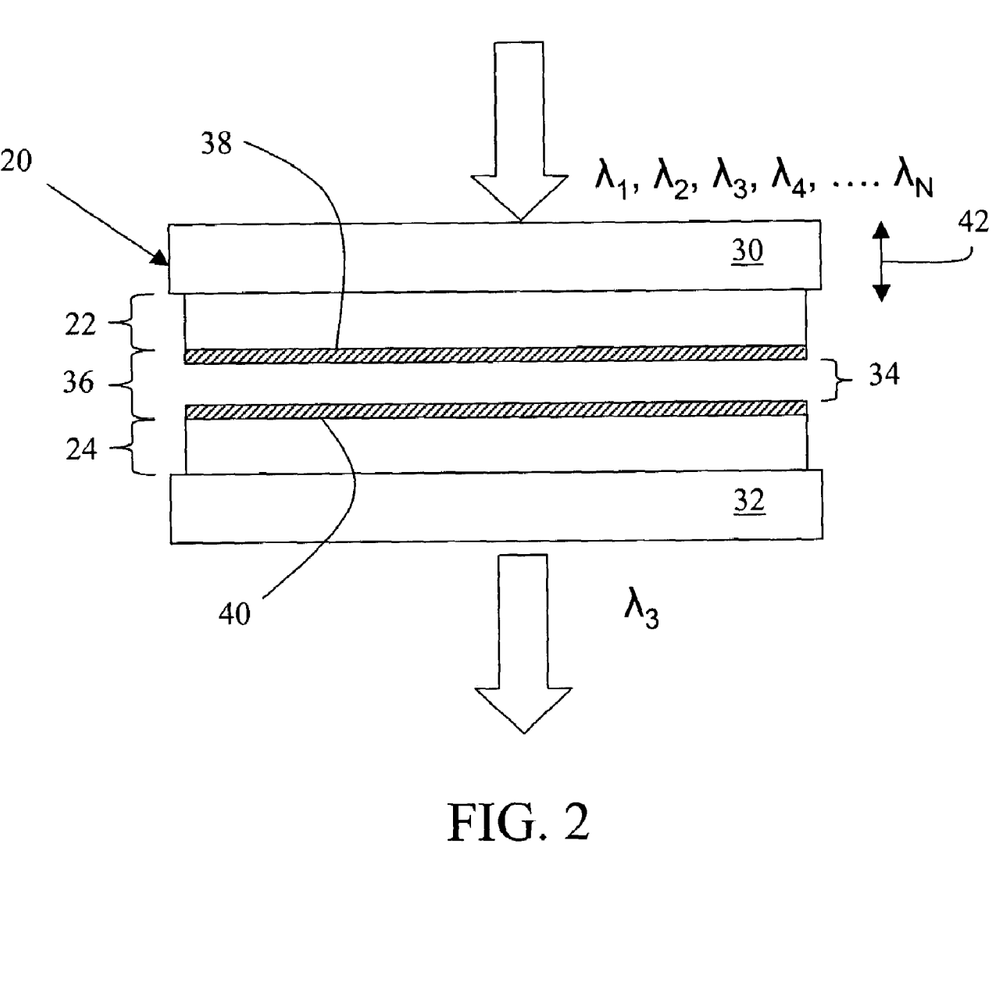
FIG. 2 is a section view of a partitioned-cavity tunable Fabry-Perot filter in accordance with the present invention.

As shown in FIG. 2, a tunable Fabry-Perot filter 20 includes a pair of planar, parallel reflectors 22 and 24, typically multilayer dielectric, graded index or metallic films formed on transparent substrates 30 and 32, surrounding a variable air gap 34. The conventional air gap cavity is replaced with a partitioned cavity 36 that has an effective refractive index, $n_{eff}$ that is greater than one ($n_{eff}>1.0$). The higher refractive index reduces the angle of the light $\Theta_c$ within the cavity layer, which in turn reduces wavelength shift and spectral broadening.

The partitioned cavity 36 includes a pair of partitioned cavity dielectric layers 38 and 40 formed on the reflectors 22 and 24 on either side of variable air gap 34. Each of the partitioned cavity dielectric layers has an optical thickness less than one fourth the shortest wavelength within the tuning range of the filter. If the layer is quarter wave or thicker, they become effectively part of the reflectors and create unusual phase interference effects that generate unwanted passbands.

The resulting three-layer partitioned cavity has an effective optical thickness substantially equal to an integral multiple (m) of one halfwave at a desired bandpass wavelength. In the case of metal film reflectors the optical thickness is an exact integral multiple. However, in the case of dielectric film reflectors the electric field standing wave can extend slightly into the films. To maximize the peak transmission of the filter the dielectric layers (reflector layers and partitioned cavity layers) must be symmetric on either side of the air gap. If not the amplitude of the reflection and its phase are different at each reflector, causing reduced filter transmission.

A tuning mechanism 42 such as a piezoelectric, electrostatic or electromagnetic actuator including a flexure structure for holding the reflectors in a substantially parallel alignment varies the optical thickness of the cavity to change the transmitted wavelength over a tuning range. As the gap shrinks, the effective refractive index of the partitioned cavity increases as the relative contribution of the partitioned cavity dielectric layers increases. This has the effect of modifying the wavelength vs. cavity thickness relationship as well as further reducing the filter's angle sensitivity as the air gap is reduced. The tuning mechanism must account for this non-linearity when tuning the filter.

Figure 3:
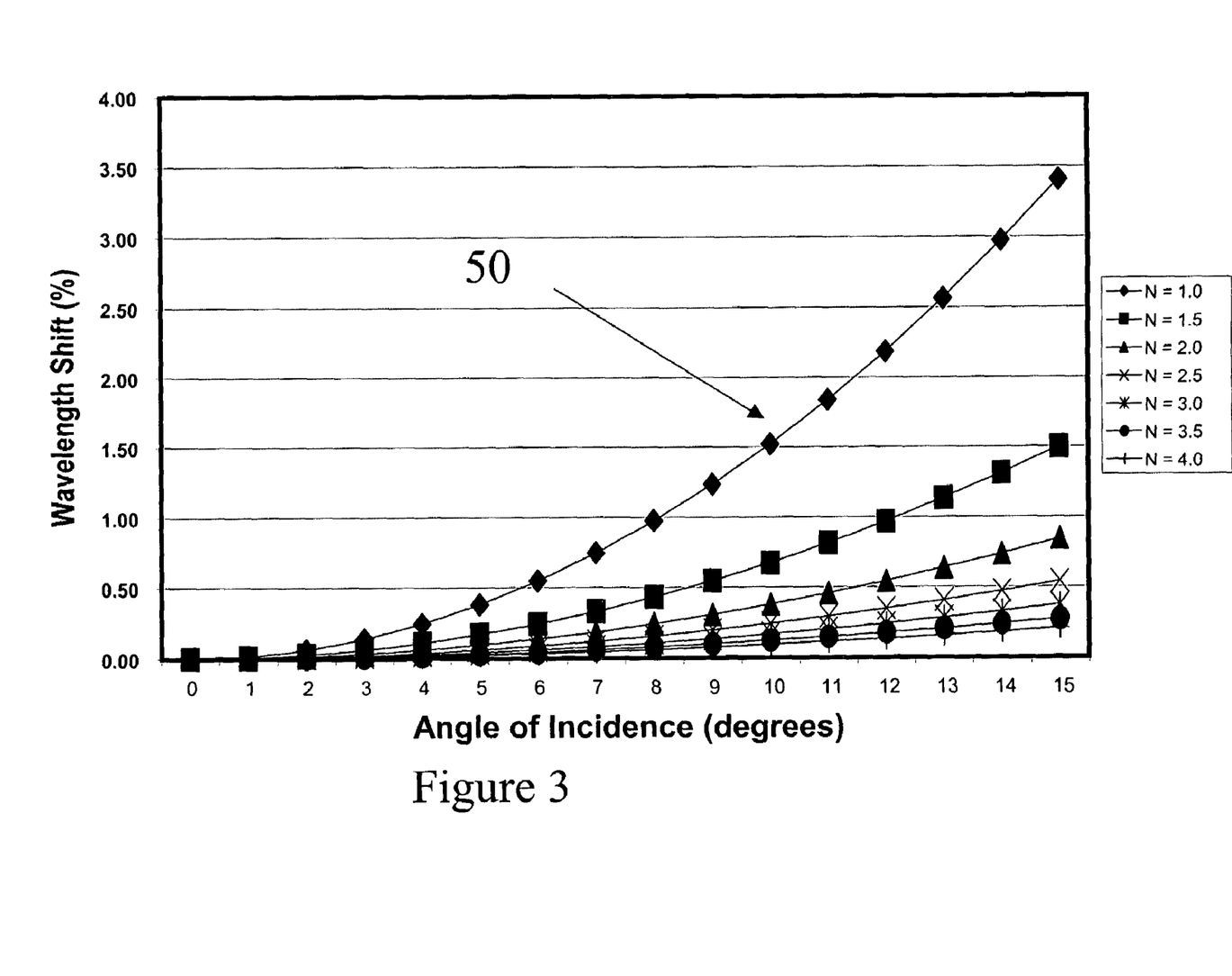
FIG. 3 is a plot of the approximate percentage wavelength shift for a Fabry-Perot filter versus angle of incidence for different effective refractive indices for the partitioned-cavity.

As shown in FIG. 3, the central wavelength 50 of the all-dielectric Fabry-Perot filter will shift lower in wavelength with an increase in the incident angle. The amount of wavelength shift is dependent upon the incident angle and the effective refractive index ($n_{eff}$) of the filter cavity. The following formula may be used to determine the percentage wavelength shift of a filter in collimated light with incident angles up to 15 degrees:

$$\Delta\lambda\% = \{1 - [A]^{1/2}\} * 100 \quad (2)$$

$$A = [1 - (N_e/n_{eff})^2 \sin^2 \Theta] \quad (3)$$

Where: $\Delta\lambda\%$ Percent Wavelength Shift
$N_e$ = Refractive index of external medium
$n_{eff}$ = Effective refractive index of the filter
$\Theta$ = Angle of incidence When a Fabry-Perot filter is illuminated with non-collimated light, as for convergent or divergent rays, the spectral response is obtained by integrating the response over all incident solid angles. This results in an effective wavelength shift of the spectral transmission band, an effective spectral broadening, and a reduction in peak transmittance.

Figure 4A:
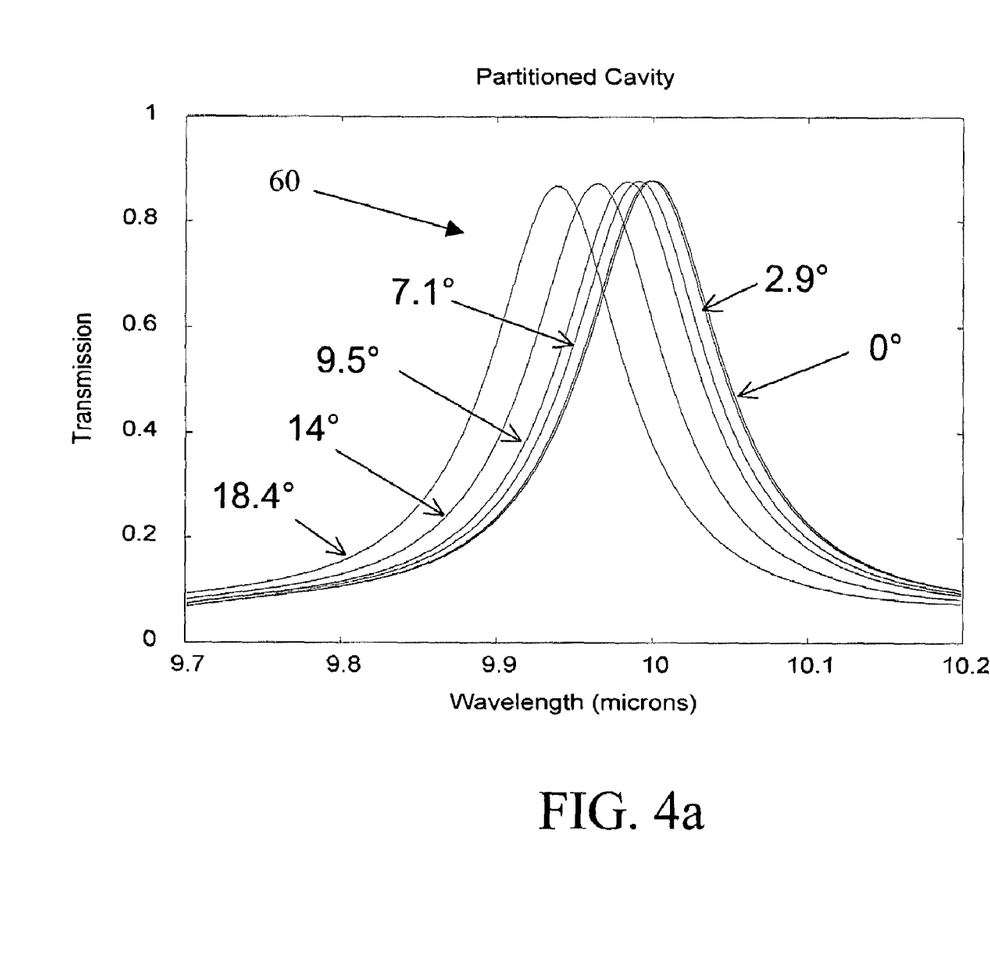
FIGS. 4a and 4b are plots of transmission versus wavelength for a partitioned cavity Fabry-Perot filter illustrating wavelength shift and spectral broadening for different angles of incidence and f-numbers, respectively.
Figure 4B:
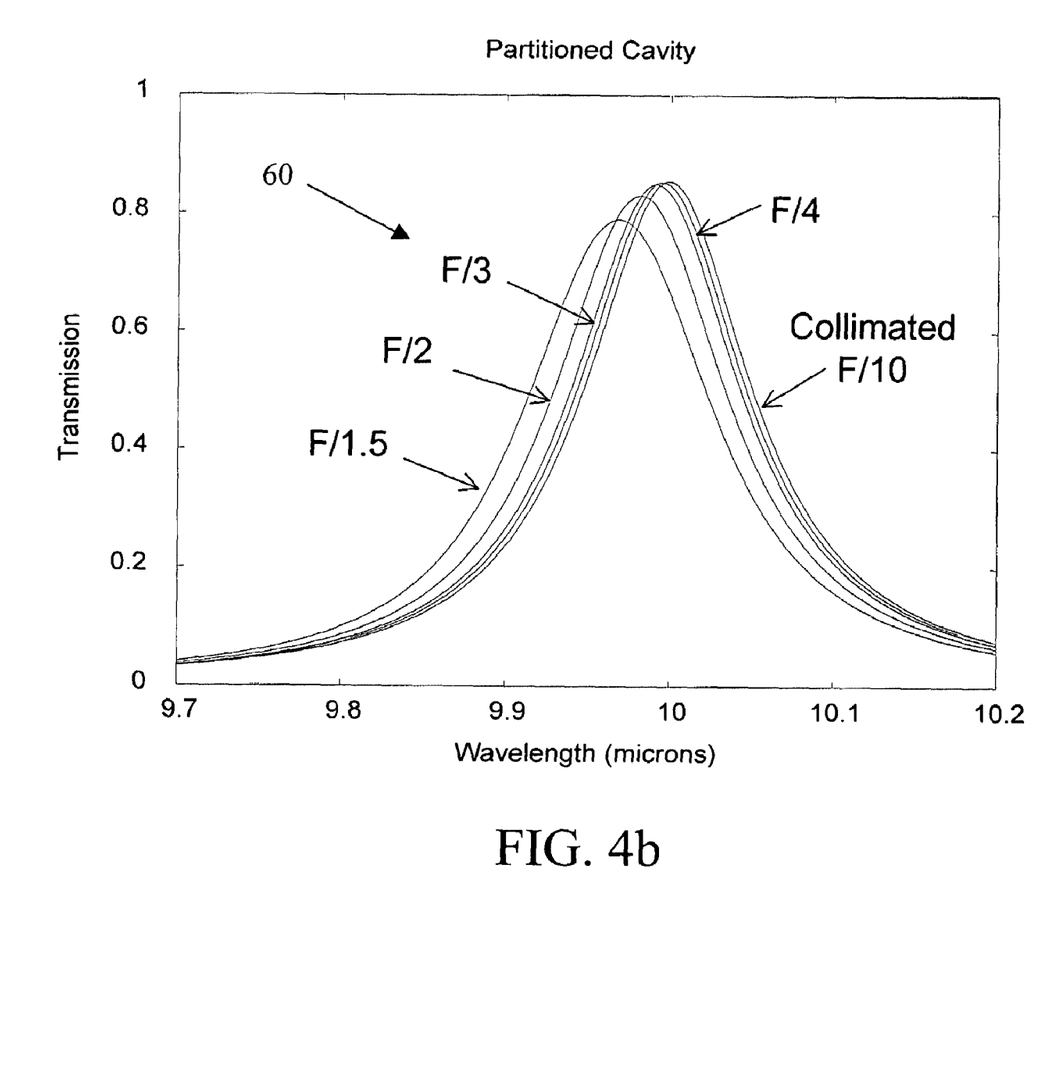

FIGS. 1a and 1b show the spectral transmission response of a conventional air-gap Fabry-Perot filter calculated for collimated rays at different angles of incidence (FIG. 1a) and integrated over a convergent cone of rays or different f-numbers (FIG. 1b). For comparison FIGS. 4a and 4b, show the wavelength shift 60 for a given angle of incidence or f-number—for the partitioned-cavity filter of the present invention. Comparing FIG. 4a to FIG. 1a, the wavelength shift for a filter with a partitioned cavity having $n_{eff} \approx 2.5$ is significantly less than that of a conventional air gap filter having neff=1.

Although the partitioned cavity reduces angle sensitivity for filters having m>1, the design is most effective for m=1, the "lowest order" tunable Fabry-Perot filter. When m=1, the relative volume fraction of the two partitioned cavity dielectric layers (n>1.0) within the partitioned cavity versus the air gap (n=1), is the greatest, resulting in the highest effective refractive index for the partitioned cavity. For such filters and wavelengths of commercial interest (approximately 0.4 to 12.0 microns), the nominal air gap is very small, ranging from <1.0 µm to a few µm.

The partitioned cavity principles may also be employed in Fabry-Perot filters at longer infrared wavelengths (λ>12.0 µm), millimeter and microwave wavelengths. These filters may be single aperture components, with optical dimensions of several mm to several cm, or they may be MEMS structures that are either very small individual filter elements or arrays of independently addressed filters elements.

Depending upon the application and the filter specifications, the reflectors and dielectric layers that form the partitioned cavity can be configured in a number of different ways. As mentioned, the reflectors may be formed from multilayer thin film interference mirrors, e.g. a quarter-wave stack, a graded index film, e.g. a rugate reflector, or a thin metal film. Furthermore, the partitioned cavity dielectric layers may have a uniform or graded composition.

Figure 5:
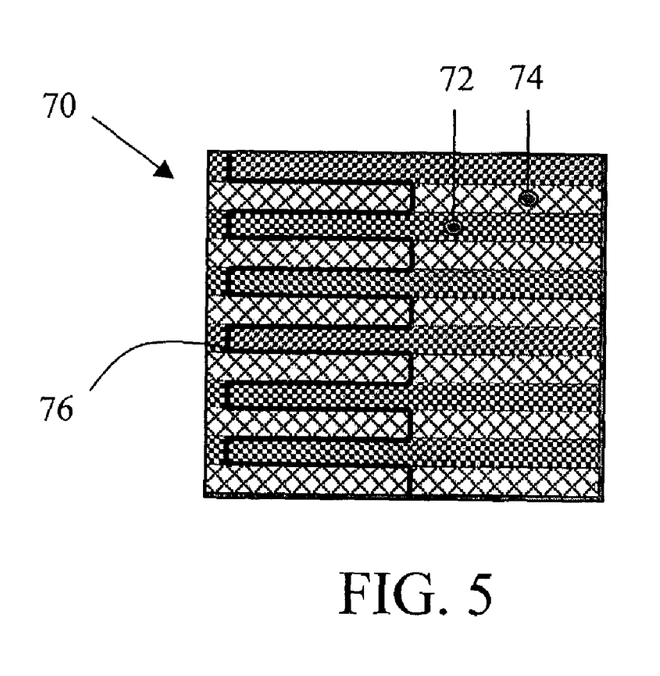
FIG. 5 is an illustration of a reflector comprising multilayer thin film layers.

In a first case, partitioned cavity dielectric layers having uniform composition are formed on a quarter-wave stack 70 of the type illustrated in FIG. 5. The stack includes alternating layers 72 and 74 of high and low refractive index, each layer having an optical thickness of one-quarter wave, typically referenced to the center wavelength in the tuning range, and a uniform composition. This creates a refractive index profile 76 that is approximately an alternating step versus thickness. The stack produces high reflectivity over a limited range of wavelengths. A larger difference in the refractive indices of the low and high index materials widens the range. Increasing the number of layer pairs increases the reflectivity of the stack and steepens the edges of the reflection band. The advantage of this configuration is the high reflectivity and relative ease of fabrication using conventional multilayer optical thin film processing methods.

Figure 6:
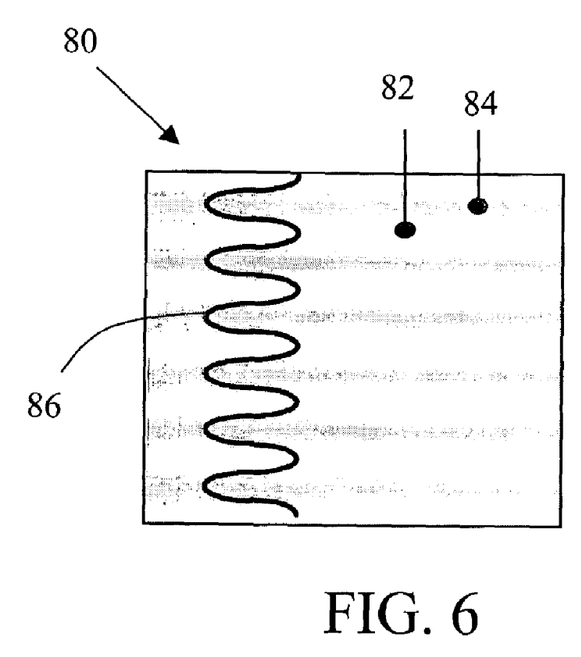
FIG. 6 is an illustration of a reflector comprising a graded index rugate film.

In a second case, partitioned cavity dielectric layers having uniform composition are formed on graded index films 80 (rugate reflectors) of the type illustrated in FIG. 6. The rugate reflector is a coating that has a continuous variation of refractive index with thickness including alternating regions 82 and 84 of high and low refractive indices. In the purest form, a rugate reflector is formed by codepositing two different materials and varying the relative deposition rates. The resulting film consists of a mixed composition layer with the composition varying with thickness. In another fabrication method, the graded refractive index profile can be achieved by depositing very thin discrete layers of alternating materials. A rule of thumb is that the layers will behave as if they are continuous if the thickest layer is less than 1/10 the shortest wavelength of interest in which case the coating appears optically to have a continuously graded composition.

The rugate reflector has a refractive index profile 86 that is approximately a sine wave versus thickness. The period of the sinewave is equal to the optical thickness of single HL pair in the equivalent quarterwave stack. As in the quarterwave stack, the width of the resulting reflection band is proportional to the difference of the high and low refractive indices. Unlike the quarterwave stack, the sinewave rugate reflector does not exhibit odd reflection harmonics, which may interfere with desired optical effects at shorter wavelengths outside the tuning band. However, the rugate filter is more difficult and expensive to fabricate.

In a third case, partitioned cavity dielectric layers having uniform composition are formed on thin metal films such as silver. In this case, mirror reflectance relies on the reflectivity of the material and not on multilayer interference effects. These films are much thinner than the multilayer dielectric films and thus place much less stress on the substrate. However, the absorption of metal films is significant and will reduce the maximum theoretical filter transmission well below 100%.

Figure 7:
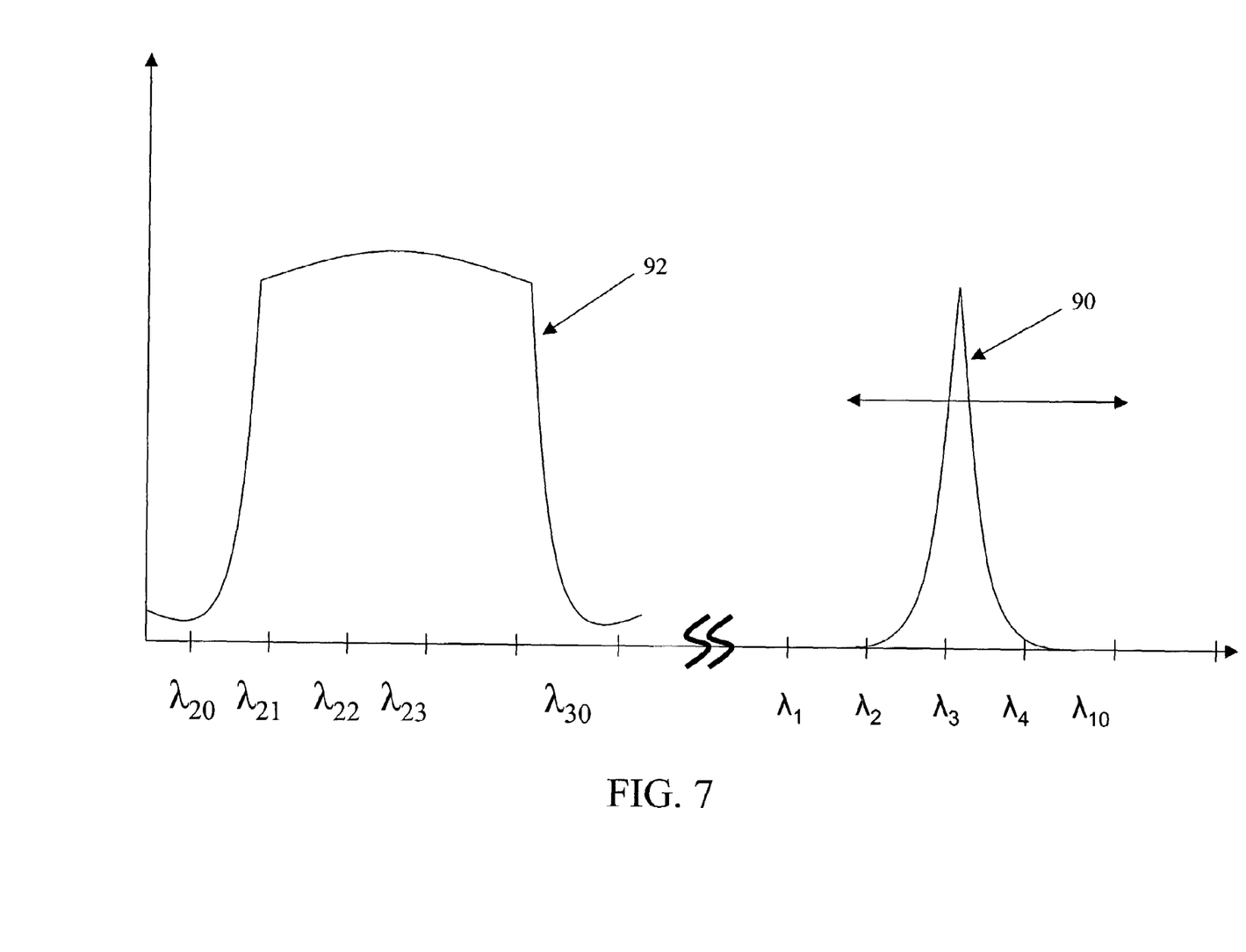
FIG. 7 is a plot of the optical spectrum for a partitioned-cavity filter that includes a multilayer or rugate reflector combined with a graded index partitioned cavity layer.

In a fourth case, a filter can be designed to provide narrowband wavelength tuning in one band 90 of wavelengths, while providing broadband transmission within another wavelength band 92 as illustrated in FIG. 7. This relies on two features of dielectric thin films. First, the spectral width of the reflection band of a multilayer or rugate thin film mirror is limited. Narrow Fabry-Perot passband characteristics are obtained at wavelengths where reflectivity is high. Where the coating reflectivity is low, the effective passband of the filter becomes quite broad. In the limit where the mirror coatings have zero reflectivity outside of the reflection band, the filter appears to light as a transparent window, there is no optical resonance, and the transmission characteristics are completely independent of the filter air gap spacing. Rugate filters have an advantage over multilayer reflectors in that they can be designed to prevent short wavelength reflection harmonics.

The other feature that enables this dual capability is the use of graded index antireflection layers as the partitioned cavity layers. A graded index antireflection coating layer has a gradual change in refractive index from high (adjacent to the reflector) to low (adjacent to the air gap). These films help to produce broadband regions outside of the primary tuning band of the filter.

An example of a filter design exhibiting these features is one that allows narrowband tuning in the long wavelength infrared (LWIR, nominally 8-12 micron) band, while simultaneously allowing broadband transmission in the mid wavelength infrared (MWIR, nominally 3-5 micron) band. If mirror reflectivity is sufficiently low (<10%) across the 3-5 micron band, there will be very little impact on the MWIR spectral transmission resulting from tuning in the LWIR.

Conventional partitioned cavity layers could actually increase the reflectivity at specific wavelengths outside of the tuning band, for example in the 3-5 band, impacting broadband transmission. A graded index antireflection coating layer has a gradual change in index from high (adjacent to the mirror) to low (adjacent to the air gap). This effectively minimizes the effect of that layer at the shorter wavelengths, while still acting as a partitioned cavity layer in the tuning band. Of course, it will not be as effective for improving field of view as a single high index layer, but this is s system compromise.

With modifications in reflector design and gradient index partitioned cavity layer design, it is also possible to achieve broadband transmission response at wavelengths that are longer than the primary filter tuning range.

Figure 8:
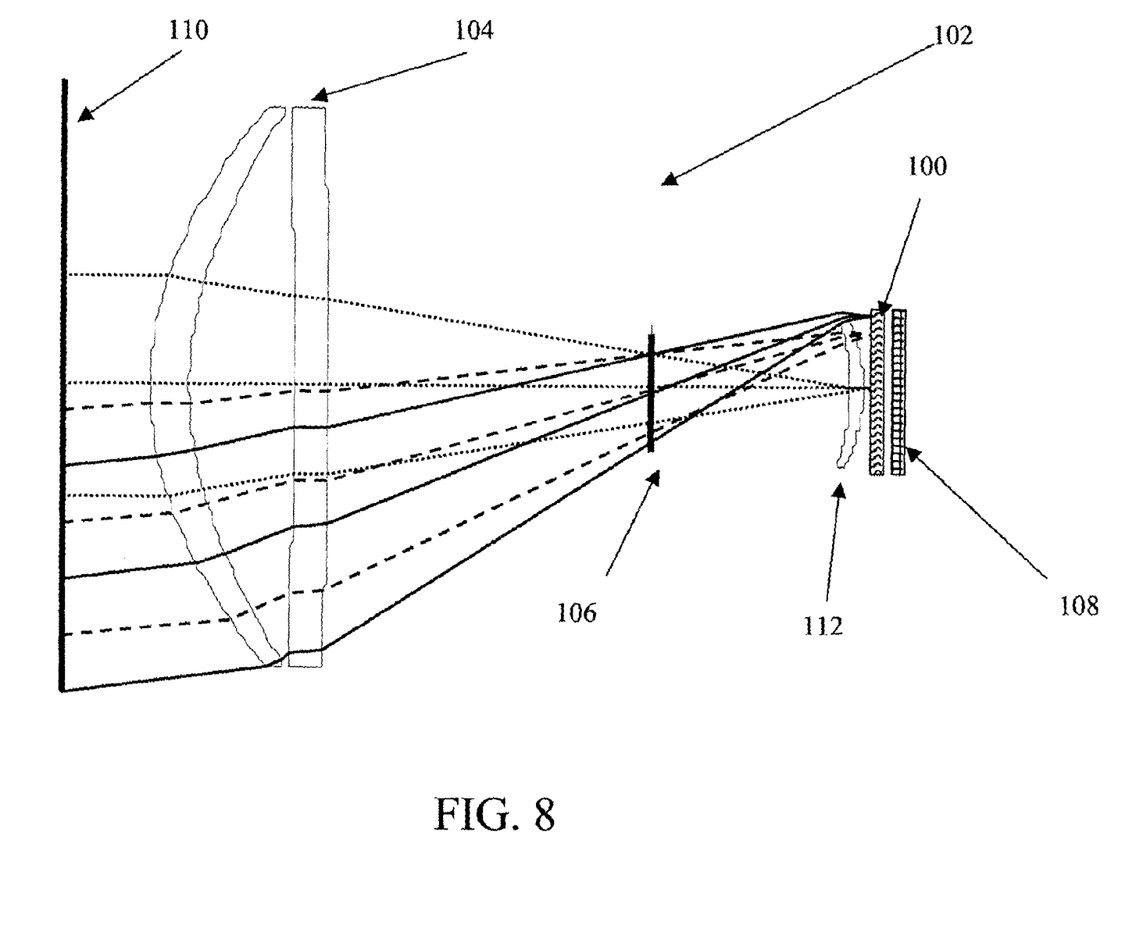
FIG. 8 is a schematic of a tunable Fabry-Perot filter in accordance with the present invention within an imaging system.

FIG. 8 shows a partitioned cavity Fabry-Perot filter 100 of the present invention positioned within an optical imaging system 102. The filter or array of filters is positioned at an image plane of the imaging system, defined by the objective lens 104 and cold stop 106 in front of a detector array 108. The filter is illuminated by converging light from object plane 110 through objective lens 104. As shown, a field lens 112 is positioned in front of the filter, collimating all of the chief rays, and reducing the total range of angles incident on the filter. Alternately, the field lens can be omitted so that the central, or chief rays for each ray bundle, corresponding to different points in the image, impinge on the filter at different angles. The use of a partitioned cavity filter in this system configuration enables imaging systems with much lower f-number than could be employed with a conventional air-gap Fabry-Perot tunable filer.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A tunable optical filter for transmitting light in a band of wavelengths centered about a bandpass wavelength that is tunable over a second wider band, comprising:

first and second reflectors held in substantially parallel alignment and separated by a variable air gap;

a partitioned cavity including a first dielectric layer on the first reflector, the variable air gap and a second dielectric layer on the second reflector, said partitioned cavity having an effective optical thickness substantially equal to an integral multiple of one half the bandpass wavelength and having an effective refractive index ($n_{eff}$) greater than two, said first and second dielectric layers each having an optical thickness less than one fourth of the shortest wavelength within the second wider band; and a tuning mechanism for moving at least one of said reflectors to vary the air gap and tune the bandpass wavelength, said filter having an associated transmission spectrum which shifts to shorter wavelengths as the angle of incidence (θ) of light impinging on the filter increases from normal incidence, said partitioned cavity arranged such that the magnitude of said shift for a given θ is less than it would be for a filter having a cavity consisting solely of an air gap.

2. The tunable optical filter of claim 1, wherein said first and second reflectors each comprise a quarter-wave stack including a plurality of layers of alternating high and low refractive index each having an optical thickness equal to one fourth of a reference wavelength within the second wider band.

3. The tunable optical filter of claim 2, wherein said first and second dielectric layers each comprise the same material as the high refractive index layer in the quarter-wave stack.

4. The tunable optical filter of claim 1, wherein said first and second reflectors each comprise a metal film.

5. The tunable optical filter of claim 1, wherein said first and second reflectors each comprise a gradient index rugate reflector having continuously modulated refractive index.

6. The tunable optical filter of claim 1, wherein said first and second dielectric layers are of equal optical thickness.

7. The tunable optical filter of claim 6, wherein said first and second dielectric layers each comprise a single material having a constant refractive index throughout its thickness.

8. The tunable optical filter of claim 1, wherein said first and second dielectric layers each comprise a gradient index layer having a refractive index that varies monotonically from a low value proximate the air gap to a high value proximate the reflector.

9. The tunable optical filter of claim 8, wherein said filter also transmits light at wavelengths in a fixed band of wavelengths outside of the second wider band.

10. The tunable optical filter of claim 1, wherein said partitioned cavity has an effective optical thickness equal to one half the bandpass wavelength.

11. The tunable optical filter of claim 1, wherein the variable air gap has an optical thickness less than one half the bandpass wavelength.

12. The tunable optical filter of claim 1, wherein the tuning mechanism comprises one of a piezoelectric, electrostatic or electromagnetic actuator.

13. The tunable optical filter of claim 1, wherein said filter is arranged such that said bandpass wavelength is tunable within a range of 3-12 microns.

14. The tunable optical filter of claim 1, wherein said filter is arranged such that said bandpass wavelength is tunable within a range of 8-12 microns.

15. A tunable optical filter for transmitting light in a band of wavelengths centered about a bandpass wavelength that is tunable within a range of 3-12 microns, comprising:

first and second reflectors held in substantially parallel alignment and separated by a variable air gap;

a partitioned cavity including a first dielectric layer on the first reflector, the variable air gap and a second dielectric layer on the second reflector, said partitioned cavity having an effective optical thickness substantially equal to an integral multiple of one half the bandpass wavelength and having an effective refractive index greater than two, said first and second dielectric layers each having an optical thickness less than one fourth of the shortest wavelength within said range of 3-12 microns; and a tuning mechanism for moving at least one of said reflectors to vary the air gap and tune the bandpass wavelength, said filter having an associated transmission spectrum which shifts to shorter wavelengths as the angle of incidence ($\theta$) of light impinging on the filter increases from normal incidence, said partitioned cavity arranged such that the magnitude of said shift for a given $\theta$ is less than it would be for a filter having a cavity consisting solely of an air gap.

* * * * *